(12) United States Patent
Kim et al.

(10) Patent No.: US 9,164,970 B2
(45) Date of Patent: Oct. 20, 2015

(54) USING STRUCTURED DATA FOR ONLINE RESEARCH

(71) Applicant: Microsoft Corporation, Redmond, WA (US)

(72) Inventors: Jane T. Kim, Seattle, WA (US); Sean Lyndersay, Mountain View, CA (US); Miladin Pavlicic, Sammamish, WA (US); Walter V. von Koch, Seattle, WA (US); Benjamin N. Truelove, Lynnwood, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/462,357

(22) Filed: Aug. 18, 2014

(65) Prior Publication Data

US 2014/0359414 A1  Dec. 4, 2014

Related U.S. Application Data

(63) Continuation of application No. 13/866,904, filed on Apr. 19, 2013, now Pat. No. 8,832,146, which is a continuation of application No. 11/705,350, filed on Feb. 12, 2007, now Pat. No. 8,429,185.

(51) Int. Cl.
*G06F 7/00* (2006.01)
*G06F 17/30* (2006.01)
*G06F 17/22* (2006.01)

(52) U.S. Cl.
CPC ........ *G06F 17/2247* (2013.01); *G06F 17/2235* (2013.01); *G06F 17/30864* (2013.01); *G06F 17/30882* (2013.01)

(58) Field of Classification Search
CPC .......... G06F 17/30864; G06F 17/2247; G06F 17/30882
See application file for complete search history.

(56) References Cited

U.S. PATENT DOCUMENTS

| 5,842,203 | A |   | 11/1998 | D'Elena et al. |
| 5,935,210 | A | * | 8/1999  | Stark ............................ 709/224 |
| 6,081,263 | A |   | 6/2000  | LeGall et al. |
| 6,125,384 | A |   | 9/2000  | Brandt et al. |

(Continued)

FOREIGN PATENT DOCUMENTS

| AU | 2008216396 | 5/2012 |
| JP | 2000047789 | 2/2000 |

(Continued)

OTHER PUBLICATIONS

"Decision on Reexamination", CN Application No. 200880004646. X, Feb. 12, 2015, 8 pages.

(Continued)

*Primary Examiner* — Azam Cheema
(74) *Attorney, Agent, or Firm* — John Jardine; Kate Drakos; Micky Minhas

(57) ABSTRACT

Various embodiments utilize structured data contained within a resource, such as a web page, to enable a user to define collections of data. Individual constituent parts of a collection or "links" are collected within a collection. In one or more embodiments, a full page viewing experience can be provided which enables users to not only view more details for a given link, but to view multiple different links at a time. Other viewing options and collection interactions are provided.

20 Claims, 10 Drawing Sheets

(56) References Cited

U.S. PATENT DOCUMENTS

| | | | |
|---|---|---|---|
| 6,128,624 A | 10/2000 | Papierniak et al. | |
| 6,151,584 A | 11/2000 | Papierniak et al. | |
| 6,212,494 B1 | 4/2001 | Boguraev | |
| 6,237,030 B1 | 5/2001 | Adams et al. | |
| 6,282,537 B1 | 8/2001 | Madnick et al. | |
| 6,282,548 B1 | 8/2001 | Burner et al. | |
| 6,298,401 B1 | 10/2001 | Anderson | |
| 6,370,541 B1 | 4/2002 | Chou et al. | |
| 6,546,393 B1 | 4/2003 | Khan | |
| 6,564,342 B2 | 5/2003 | Landan | |
| 6,591,266 B1 | 7/2003 | Li et al. | |
| 6,725,425 B1 | 4/2004 | Rajan et al. | |
| 6,757,674 B2 | 6/2004 | Wiens et al. | |
| 6,768,994 B1 | 7/2004 | Howard et al. | |
| 6,873,984 B1 | 3/2005 | Campos et al. | |
| 6,945,458 B1 | 9/2005 | Shah et al. | |
| 6,980,984 B1 | 12/2005 | Huffman et al. | |
| 6,990,494 B2 | 1/2006 | Bates et al. | |
| 6,993,534 B2 | 1/2006 | Denesuk et al. | |
| 7,003,528 B2 | 2/2006 | Dan et al. | |
| 7,017,123 B2 | 3/2006 | Chickles et al. | |
| 7,020,667 B2 | 3/2006 | Guest et al. | |
| 7,076,521 B2 | 7/2006 | Davison | |
| 7,082,436 B1 | 7/2006 | Bayiates | |
| 7,089,237 B2 | 8/2006 | Turnbull et al. | |
| 7,117,208 B2 | 10/2006 | Tamayo et al. | |
| 7,133,908 B1 | 11/2006 | Pajak et al. | |
| 7,464,122 B1 | 12/2008 | Basko et al. | |
| 7,685,273 B1 | 3/2010 | Anastas et al. | |
| 7,702,675 B1 | 4/2010 | Khosla et al. | |
| 7,917,507 B2 | 3/2011 | Kim et al. | |
| 8,429,185 B2 | 4/2013 | Kim et al. | |
| 8,595,259 B2 | 11/2013 | Kim et al. | |
| 8,832,146 B2 | 9/2014 | Kim et al. | |
| 2001/0011275 A1 | 8/2001 | Lin et al. | |
| 2002/0083178 A1 | 6/2002 | Brothers | |
| 2002/0184095 A1 | 12/2002 | Scullard et al. | |
| 2003/0018650 A1 | 1/2003 | Priestley | |
| 2003/0040921 A1 | 2/2003 | Hughes | |
| 2003/0069924 A1 | 4/2003 | Peart et al. | |
| 2003/0085931 A1 | 5/2003 | Card et al. | |
| 2003/0212649 A1 | 11/2003 | Denesuk et al. | |
| 2004/0002988 A1 | 1/2004 | Seshadri et al. | |
| 2004/0049574 A1 | 3/2004 | Watson et al. | |
| 2004/0068527 A1 | 4/2004 | Smith, III | |
| 2004/0088713 A1 | 5/2004 | Myllymaki et al. | |
| 2004/0162895 A1 | 8/2004 | Mok et al. | |
| 2004/0186826 A1 | 9/2004 | Choi et al. | |
| 2004/0189696 A1 | 9/2004 | Shirriff | |
| 2004/0205076 A1 | 10/2004 | Huang et al. | |
| 2004/0205514 A1 | 10/2004 | Sommerer et al. | |
| 2004/0254855 A1* | 12/2004 | Shah | 705/26 |
| 2005/0102292 A1 | 5/2005 | Tamayo et al. | |
| 2005/0102328 A1 | 5/2005 | Ring et al. | |
| 2005/0114353 A1 | 5/2005 | Malik et al. | |
| 2005/0138110 A1 | 6/2005 | Redlich et al. | |
| 2005/0138111 A1 | 6/2005 | Aton et al. | |
| 2005/0138160 A1 | 6/2005 | Klein et al. | |
| 2005/0177573 A1 | 8/2005 | Gauthier et al. | |
| 2005/0197927 A1* | 9/2005 | Martineau et al. | 705/27 |
| 2005/0216528 A1 | 9/2005 | Cheng | |
| 2005/0216825 A1 | 9/2005 | Teague | |
| 2005/0216886 A1 | 9/2005 | Washburn | |
| 2005/0228899 A1 | 10/2005 | Wendkos et al. | |
| 2005/0256867 A1 | 11/2005 | Walther et al. | |
| 2005/0262239 A1 | 11/2005 | Kawakita | |
| 2005/0289468 A1 | 12/2005 | Kahn et al. | |
| 2006/0004731 A1 | 1/2006 | Seibel et al. | |
| 2006/0041830 A1 | 2/2006 | Bohn | |
| 2006/0069674 A1* | 3/2006 | Palmon et al. | 707/3 |
| 2006/0069699 A1 | 3/2006 | Smadja et al. | |
| 2006/0085492 A1 | 4/2006 | Singh et al. | |
| 2006/0095345 A1 | 5/2006 | Ka et al. | |
| 2006/0122968 A1 | 6/2006 | Naam | |
| 2006/0122998 A1 | 6/2006 | Bar-Yossef et al. | |
| 2006/0143568 A1 | 6/2006 | Milener | |
| 2006/0149833 A1 | 7/2006 | Dan et al. | |
| 2006/0155764 A1 | 7/2006 | Tao | |
| 2006/0179418 A1 | 8/2006 | Boyd | |
| 2006/0190561 A1 | 8/2006 | Conboy et al. | |
| 2006/0235811 A1 | 10/2006 | Fairweather | |
| 2007/0050703 A1 | 3/2007 | Lebgel | |
| 2007/0100834 A1 | 5/2007 | Landry et al. | |
| 2007/0174324 A1 | 7/2007 | Palapudi et al. | |
| 2007/0239734 A1 | 10/2007 | Arellanes et al. | |
| 2008/0104034 A1 | 5/2008 | Stewart et al. | |
| 2008/0195628 A1 | 8/2008 | Kim | |
| 2008/0195629 A1 | 8/2008 | Kim | |
| 2011/0173636 A1 | 7/2011 | Kim | |
| 2014/0149835 A1 | 5/2014 | Kim | |

FOREIGN PATENT DOCUMENTS

| | | |
|---|---|---|
| JP | 2001184354 | 7/2001 |
| JP | 2002297486 | 10/2002 |
| JP | 2003058576 | 2/2003 |
| JP | 2004038572 | 2/2004 |
| JP | 2004046357 | 2/2004 |
| JP | 2005107699 | 4/2005 |
| JP | 2005173823 | 6/2005 |
| JP | 2006031666 | 2/2006 |
| TW | 200522631 | 7/2005 |
| TW | I240181 | 9/2005 |
| WO | WO-0175668 | 10/2001 |
| WO | WO-2006031741 | 3/2006 |
| WO | WO-2008100881 | 8/2008 |
| WO | WO-2008100882 | 8/2008 |

OTHER PUBLICATIONS

"A Pint of Ale—Ajax linking and Embedding", Retrieved from: <http://www.zimbra/com/blog/archives/2006/04/zimbra_ale-ajax_linking_and_embedding . . . > on Dec. 14, 2006, Zimbra—Blog,Apr. 3, 2006, 5 pages.

"Clipboard", MSDN Library, available at <http://msdn.microsoft.com/en-us/library/ms648709(v=VS.85).aspx>,Sep. 7, 2010, 5 pages.

"Search Report", EP Application No. 08729585.3, Dec. 29, 2009, 6 pages.

"Extended European Search Report", EP Application No. 08729586.1, Nov. 5, 2010, 3 pages.

"Final Office Action", U.S. Appl. No. 11/705,286, Apr. 8, 2010, 23 pages.

"Final Office Action", U.S. Appl. No. 11/705,350, Mar. 1, 2012, 13 pages.

"Final Office Action", U.S. Appl. No. 11/705,350, Apr. 8, 2011, 11 pages.

"Final Office Action", U.S. Appl. No. 13/072,050, Sep. 28, 2012, 19 pages.

"Foreign Notice of Allowance", AU Application No. 2008216396, Jan. 6, 2012, 3 pages.

"Foreign Notice of Allowance", AU Application No. 2008216397, Jan. 6, 2012, 3 pages.

"Foreign Notice of Allowance", TW Application No. 97103777, Apr. 25, 2014, 4 Pages.

"Foreign Office Action", AU Application No. 2008216396, Nov. 15, 2011, 2 pages.

"Foreign Office Action", AU Application No. 2008216397, Nov. 25, 2011, 3 pages.

"Foreign Office Action", Chilean Application No. 425-2008, Oct. 15, 2009, 5 pages.

"Foreign Office Action", Chilean Application No. 426-2008, Apr. 9, 2010, 5 pages.

"Foreign Office Action", CN Application No. 200880004644.0, Apr. 12, 2012, 6 pages.

"Foreign Office Action", CN Application No. 200880004644.0, Jul. 26, 2011, 7 pages.

"Foreign Office Action", CN Application No. 200880004646.X, Feb. 21, 2012, 6 pages.

(56) References Cited

OTHER PUBLICATIONS

"Foreign Office Action", CN Application No. 200880004646.X, Mar. 16, 2011, 8 pages.
"Foreign Office Action", CN Application No. 200880004646.X, Jul. 2, 2012, 6 pages.
"Foreign Office Action", CN Application No. 200880004646.X, Sep. 26, 2012, 5 pages.
"Foreign Office Action", EP Application No. 08729585.3, Mar. 11, 2010, 4 pages.
"Foreign Office Action", EP Application No. 08729586.1, Jul. 20, 2011, 4 pages.
"Foreign Office Action", JP Application No. 2009-549680, Mar. 2, 2012, 5 pages.
"Foreign Office Action", JP Application No. 2009-549681, Sep. 28, 2012, 6 pages.
"Foreign Office Action", TW Application No. 97103777, Oct. 22, 2013, 23Pages.
"Foreign Office Action", TW Application No. 97104654, Nov. 27, 2013, 10 pages.
"International Search Report and Written Opinion", Application No. PCT/US2008/053643, May 29, 2008, 11 pages.
"Kaboodle Get Started", Retrieved from: <http://www.kaboodle.com/zd/help/getStarted.html> on Jun. 4, 2007, 2007, 4 pages.
"Live Clipboard Example", retrieved from <http://classic-web.archive.org/web/20070205203944/http://spaces.msn.com/editorial/rayozzie/demo/liveclip/liveclipsample/microformats/hCard.js> and <http://classic-web.archive.org/web/20070205203944/http://spaces.msn.com/editorial/rayozzie/d, 2 pages.
"Live Clipboard Screencasts", retrieved from <http://spaces.live.com/editorial/rayozzie/demo/liveclip/screencast/liveclipdemo.html> on Jun. 5, 2007, 1 page.
"Live Clipboard Technical Introduction", retrieved from <http://spaces.live.com/editorial/rayozzie/demo/liveclip/liveclipsample/techPreview.html> on Jun. 5, 2007, 4 pages.
"Microsoft RSS Blog", Retrieved from: <http://blogs.msdn.com/rssteam/archive/2006/01/25/517473.aspx> on Jun. 5, 2007, Jan. 25, 2006, 3 pages.
"Microsoft Team RSS Blog: SSE Update and Tutorial", retrieved from <http://blogs.msdn.com/rssteam/archive/2006/01/25/517473.aspx>on Dec. 14, 2006,Jan. 25, 2006, 3 pages.
"Non Final Office Action", U.S. Appl. No. 11/705,286, Mar. 25, 2009, 17 pages.
"Non-Final Office Action", U.S. Appl. No. 11/705,286, Oct. 9, 2009, 18 pages.
"Non-Final Office Action", U.S. Appl. No. 11/705,286, Aug. 2, 2010, 19 pages.
"Non-Final Office Action", U.S. Appl. No. 11/705,350, Nov. 3, 2010, 13 pages.
"Non-Final Office Action", U.S. Appl. No. 11/705,350, Aug. 18, 2011, 12 pages.
"Non-Final Office Action", U.S. Appl. No. 13/072,050, Feb. 16, 2012, 13 pages.
"Notice of Allowance", U.S. Appl. No. 11/705,286, Dec. 15, 2010, 18 pages.
"Notice of Allowance", U.S. Appl. No. 11/705,350, Nov. 27, 2012, 8 pages.
"Notice of Allowance", U.S. Appl. No. 13/072,050, Jul. 19, 2013, 18 pages.
"Notice of Allowance", U.S. Appl. No. 13/866,904, May 6, 2014, 9 pages.
"Page XML Developer center: Frequently asked questions for simple sharing extensions (sse)e 1of 4", retrieved from <http://msdn.microsoft.com/xml/rss/ssefaq/> on Dec. 14, 2006, 4 pages.
"Simple Sharing Extensions for RSS and OPML", Retrieved from: <http://blogs.msdn.com/rssteam/archive/2005/12/01/498704.aspx> on Dec. 14, 2006, MSDN XML Developer Center,Dec. 2005, 9 pages.
"Simple Sharing Extensions up close", Retrieved from: <http://kinrowan.net/blog/wp/archives/2005/11/23/sse-up-close> on Dec. 14, 2006, Nov. 2005, 9 pages.
"Understanding OLE", Glencoe McGraw-Hill, Available at <http://www.glencoe.com/ps/computered/pas/article.php4?articleId=149>,2001, 3 pages.
"Zotero—The Next Generation Research Tool", retrieved from: <http://www.zotero.org> on Jun. 4, 2007, 1 page.
Boodman, "Mozilla Firefox Add-ons: Greasemonkey", Retrieved from: <https://addons.mozilla.org/firefox/748/> on Jun. 4, 2007, May 7, 2007, 2 pages.
Brand, et al., "Linking Evolved: The Future of Online Research", Retrieved from: <http://www.researchinformation.info/rispring03linking.html> on Dec. 12, 2006, 2003, 5 pages.
Burcham, "Baby Steps to Synergistic Web Apps", Retrieved from: <http://lesscode.org/2005/10/21/baby-steps-to-synergistic-web-apps/> on Dec. 14, 2006, Oct. 21, 2005, 11 pages.
Burcham, "Half a Baby Step", Retrieved from: <http://lesscode.org/2005/11/02/half-a-baby-step/> on Jun. 4, 2007, Nov. 2, 2005, 4 pages.
Burcham, "Ray Got the Memo", lesscode.org, retrieved from <http://lesscode.org/2006/03/22/ray-ozzie-got-the-memo/> on Dec. 14, 2006,Mar. 22, 2006, 4 pages.
Burcham, "Ray Ozzie Demos Web App Clipboard", Retrieved from: <www.memerocket.com/2006/03/21/ray-ozzie-demos-web-app-cipboard/> on Dec. 14, 2006, Mar. 21, 2006, 6 pages.
Cooley, "Web Mining: Information and Pattern Discovery on the World Wide Web", In Proceedings of ICTAI 2002, Available at <http://maya.cs.depaul.edu/classes/ect584/papers/cms-tai.pdf>,2002, 10 pages.
Faaborg, "Mozilla Labs Blog: Introducing Operator", Retrieved from: <http://labs.mozilla.com/2006/12/introducing-operator> on Jun. 4, 2007, Dec. 16, 2006, 16 pages.
Hinchcliffe, "How Simple Sharing Extensions Will Change the Web", Retrieved from: <http://web2.wsj2.com/how_simple_sharing_extensions_will_change_the_web.htm> on Jun. 5, 2007, Dion Hinchcliffe's Web 2.0 Blog,Nov. 26, 2005, 10 pages.
Kaply, "Mozilla Firefox Add-ons: Operator", Retrieved from: <https://addons.mozilla.org/firefox/4106> on Jun. 4, 2007, Apr. 3, 2007, 3 pages.
Kevin, et al., "Data Mining for Web Intelligence", Journal Computer, vol. 35, Issue 11, Available at <http://citeseerx.ist.psu.edu/viewdoc/download?doi=10.1.1.13.7499&rep=rep1&type=pdf>,Nov. 2002, pp. 54-60.
Kosala, et al., "Web Mining Research: A Survey", vol. 2, Issue 1, http://www.inf.unisinos.br/-renata/cursos/topicosiv/web-mining-survey.pdf, Jul. 2000, 15 pages.
Moromisato, "Microsoft Team RSS Blog—More on SSE", Retrieved from: <http://blogs.msdn.com/rssteam/archive/2005/12/07/501326.aspx> on Jun. 5, 2007, Dec. 7, 2005, 2 pages.
Obasanjo, "Metadata Quality, Events Databases and Live Clipboard", Dare Obasanjo AKA Carnage4Life, retrieved from <http://www.25hoursaday.com/weblog/PermaLink.aspx?guid=91e40df6-c973-4bf7-8eb6-0 . . . > on Dec. 14, 2006,Apr. 3, 2006, 4 pages.
Ozzie, "Really Simple Sharing", Nov. 20, 2005, 4 pages.
Ozzie, "Wiring Progress", Apr. 1, 2006, 3 pages.
Ozzie, "Wiring the web", Creative Commons Attribution-ShareAlike license, Liveclip@ discussms.hosting.lsoft.com,Mar. 2007, 5 pages.
Ozzie, et al., "Live Clipboard", Retrieved from: <http://spaces.live.com/editorial/rayozzie/demo/liveclip/specification/v092.html> on Jun. 5, 2007, Version 0.92,Apr. 21, 2006, 18 pages.
Ozzie, et al., "XML Developer Center: Frequently Asked Questions for Simple Sharing Extensions (SSE)", Retrieved from: <http://msdn.microsoft.com/xml/rss/sse/> on Jun. 4, 2007, Dec. 2006, 3 pages.
Tolliver, "Deepening Search: Exploiting structured data on the Deep Web", Retrieved from: <http://www.cs.uiuc.edu/research/KevinChang.php> on Dec. 12, 2006, Jun. 12, 2006, 2 pages.
Udell, "Dueling simplicities", Retrieved from: <http://weblog.infoworld.com/udell/2005/11/22.html> on Dec. 14, 2006, Nov. 2005, 3 pages.
Weekes, "Investigating the strengths of using structured data to search software components in an Internet environment", Retrieved from: <http://www.itee.uq.edu.au/~seminar/archive/sem-0019.html> on Dec. 12, 2006, ITEE Seminar,Jun. 4, 1999, 1 pages.
"Foreign Office Action", CN Application No. 200880004646.X, Jun. 12, 2015, 12 Pages.

* cited by examiner

USING STRUCTURED DATA FOR ONLINE RESEARCH

RELATED APPLICATIONS

This application is a continuation of and claims priority to U.S. patent application Ser. No. 13/866,904, filed Apr. 19, 2013, which is a continuation of and claims priority to U.S. patent application Ser. No. 11/705,350, filed on Feb. 12, 2007, the disclosure of which is incorporated in its entirety by reference herein.

BACKGROUND

Some of the tasks that a user performs online involve researching and comparing various items that they find on the web using their web browser. For example, a user may be looking for a new apartment in a particular area of Seattle. Over the course of their research, they may visit four or five different real estate sites and find one or two apartments on each site that are of particular interest to them. Typically, to compare the various apartments, the user may have to physically print a copy and paste multiple apartment listings into a document or spreadsheet. Needless to say, this is a very manual process.

Alternately, the user may opt to save each apartment page in a favorites list. This list is typically displayed in a control that is off to the side of the browser window. Here, however, when the user wishes to review their selections, the user is still faced with the onerous task of manually accessing each link and reviewing, in a generally serial fashion, the various apartments associated with the various links.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments utilize structured data contained within a resource, such as a web page, to enable a user to define collections of data. Individual constituent parts of a collection or "links" are collected within a collection. In one or more embodiments, a full page viewing experience can be provided which enables users to not only view more details for a given link, but to view multiple different links at a time.

In one or more embodiments, the browser can provide multiple different selectable views that can be applied to the various collections. Accordingly, the user can define how data of the collection is presented to them. Further, in at least some embodiments, custom views can be defined and permit views of the collections to be flexibility and extensibly defined.

BRIEF DESCRIPTION OF THE DRAWINGS

The same numbers are used throughout the drawings to reference like features.

DETAILED DESCRIPTION

Overview

Various embodiments utilize structured data contained within a resource, such as a web page, to enable a user to define collections of data. Individual constituent parts of a collection or "links" are collected within a collection. In one or more embodiments, a full page viewing experience can be provided which enables users to not only view more details for a given link, but to view multiple different links at a time.

In one or more embodiments, the browser can provide multiple different selectable views that can be applied to the various collections. Accordingly, the user can define how data of the collection is presented to them. Further, in at least some embodiments, custom views can be defined and permit views of the collections to be flexibility and extensibly defined.

In the discussion that follows, a section entitled "Example System" is provided and describes one system that can be used to implement the embodiments described herein. Following this, a section entitled "Example Structured Data" is provided and introduces the notion of structured data. Following this, a section entitled "Example Collection" is provided and describes features of a collection in accordance with one or more embodiments. A section entitled "Building A Collection" is then provided and describes how a user can build an example collection in accordance with one or more embodiments. Following this, a section entitled "Viewing or Operating on Collections" is provided and describes, in various sub-sections, how a user can build or otherwise interact with collections in one or more embodiments.

Example System

Figure 1:
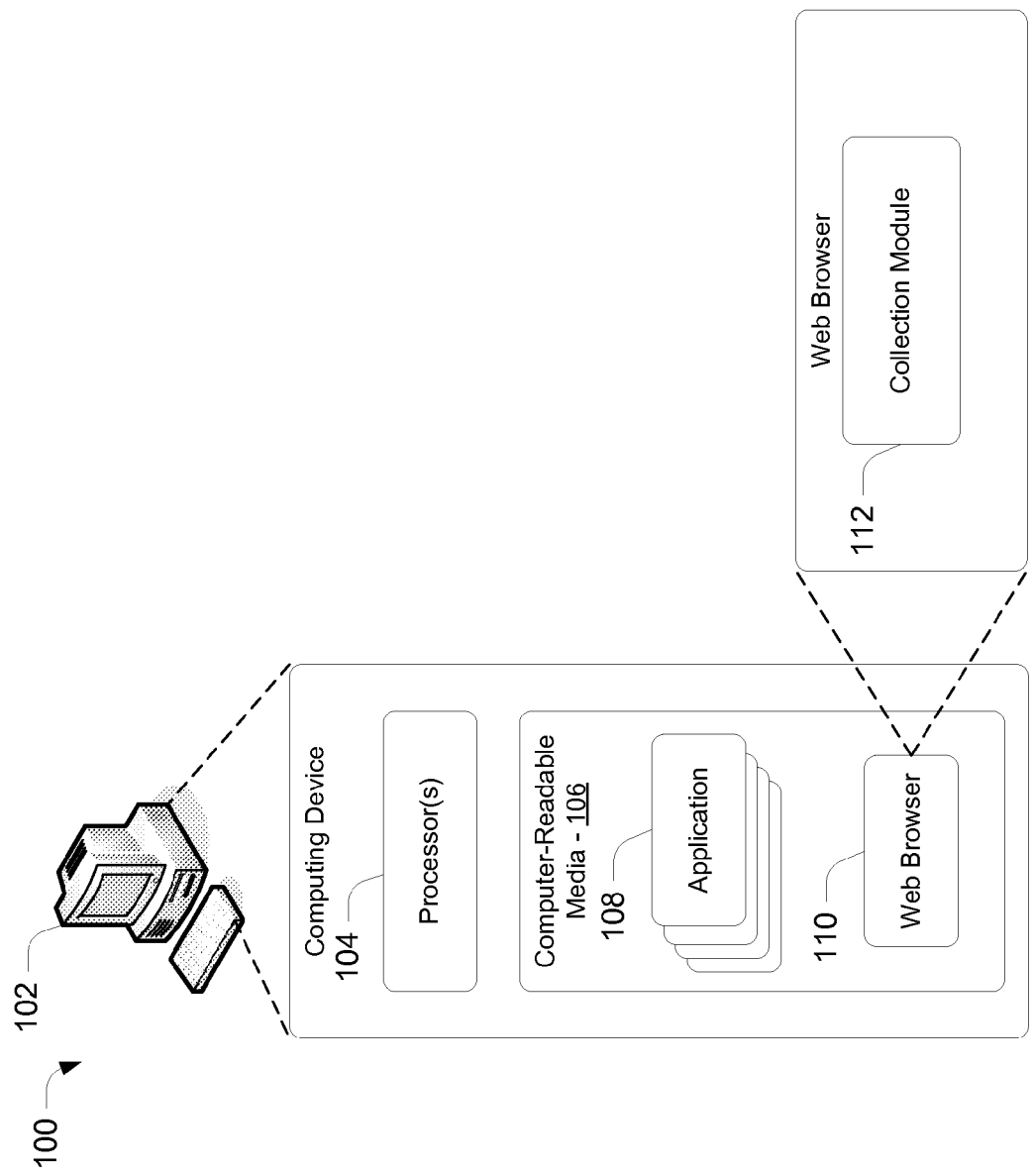
FIG. 1 illustrates a system in which various principles described herein can be employed in accordance with one or more embodiments.

FIG. 1 illustrates a system in accordance with one or more embodiments, generally at 100. System 100 includes a computing device 102 having one or more processors 104, one or more computer-readable media 106 and one or more applications 108 that reside on the computer-readable media and which are executable by the processor(s). The computer-readable media can include, by way of example and not limitation, all forms of volatile and non-volatile memory and/or storage media that are typically associated with a computing device. Such media can include ROM, RAM, flash memory, hard disk, removable media and the like. In addition, computing device 102 includes an application in the form of a web browser 110. Any suitably configured web browser can be utilized, examples of which are commercially available from the assignee of this document and others. One specific example of a computing device is shown and described below in FIG. 10.

In one or more embodiments, the web browser includes or otherwise makes use of a collection module 112 which functions as described above and below. The collection module can comprise a native part of the browser, a plug-in which is subsequently added to the browser, and/or a standalone component that is used or otherwise leveraged by the browser.

Although computing device 102 is illustrated in the form of a desktop computer, it is to be appreciated and understood that other computing devices can be utilized without departing from the spirit and scope of the claimed subject matter. For example, other computing devices can include, by way of example and not limitation, portable computers, handheld computers such as personal digital assistants (PDAs), cell phones and the like.

Example Structured Data

In one or more embodiments, at least some of the data that is subject to the collection forming functionality is so-called structured data. Structured data refers to data that is in a format that can be utilized by the collection module 112. Structured data can be formatted in accordance with known or subsequently developed structured data standards, such as Extensible Markup Language (XML) or HyperText Markup Language (HTML). For example, the structured data can be described in a web page's HTML in a manner that identifies the data's particular data type. Specifically, in one or more embodiments, HTML tags can be utilized to associate a data type with a particular instance of data. Alternately or additionally, structured data can be formatted using other standards, both public and private without departing from the spirit and scope of the claimed subject matter.

Figure 2:
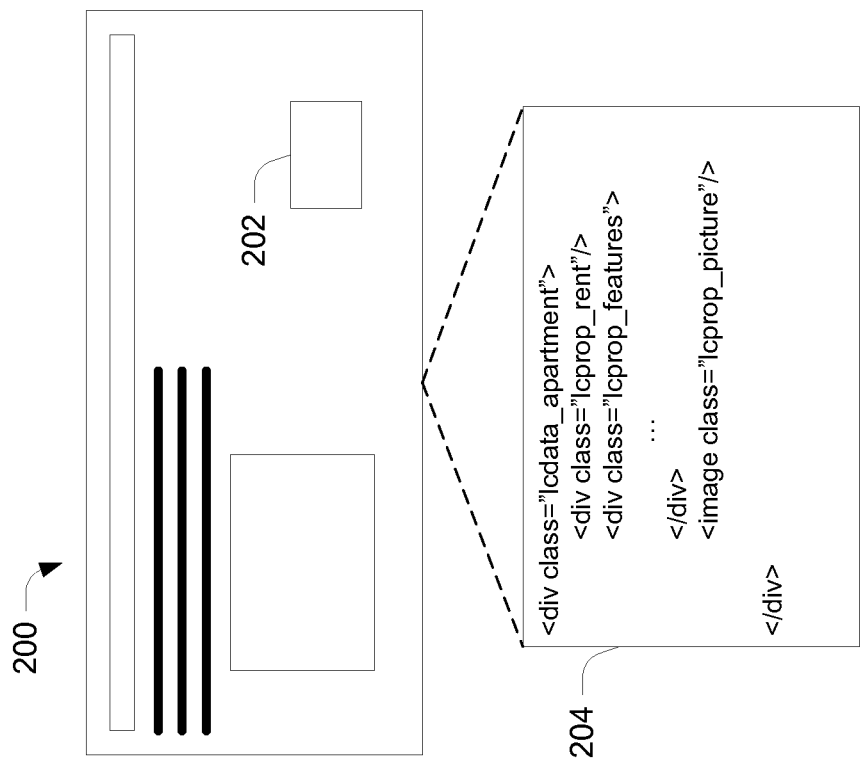
FIG. 2 illustrates an example web page that includes structured data in accordance with one or more embodiments.

As an example, consider FIG. 2. There, a web page 200 includes an apartment listing 202. In this particular instance, the apartment listing is associated with fields having data types that include an apartment data type, address data type, rent data type, features data type and a picture data type. These fields are described in the page's HTML 204 by, for example, suitable HTML tags such as the illustrated tags. Other methods and techniques can be used to associate data types with a web site's data. For example, the data types can be described in header information or other metadata that is associated with the page.

In the example just above, the structured data was specifically described as structured data through the web page's HTML. It is also possible, however, for data to not be specifically described as structured data, but to be subsequently processed and utilized by the collection module 112 as will become apparent below.

In one or more embodiments, structured data can also come from locations other than web pages. For example, structured data can be sourced from various feeds, such as RSS feeds, from data that has been added to the client, e.g. to a suitable web store, and/or from various web applications. It is to be appreciated and understood that structured data can come from other locations as well, all of which are within the spirit and scope of the claimed subject matter.

Having discussed the general notion of structured data, consider now an example collection in accordance with one or more embodiments.

Example Collection

In one or more embodiments, a collection can be considered to include a collection of links that a user has, with a browser or some other application, organized in some way, such as in a folder. A collection can hold many different types of information.

Figure 3:
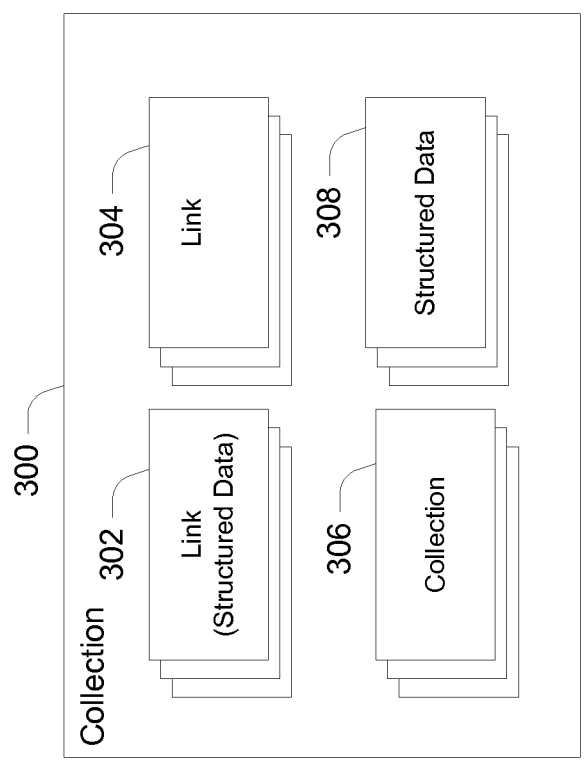
FIG. 3 illustrates an example collection in accordance with one or more embodiments.

As an example, consider FIG. 3. There, a collection 300 can include links 302 having structured data, links 304 without structured data, other collections 306 to provide for nested collections, and/or structured data without links 308. Links without structured data can be considered as links whose data are not defined in a manner that enables the data's data type(s) to be ascertained. Structured data without links can include content that resides locally that is expressed as structured data. A collection need not have all of the different types of information described above. For example, it is possible for a collection to contain only links having structured data.

Links of a collection can be associated with different data types. For example, an individual apartment link in collection 300, such as link 302, can include by way of example and not limitation, data types that include apartment, address, rent, features and image data types. In view of the fact that collections can hold a wide variety of different types of information or links, a wide variety of other data types are possible. Other data types can include, by way of example and not limitation, calendar events, photos, products, videos and the like.

Having discussed the general notion of a collection, consider now how a user can build a collection in one or more embodiments.

Building a Collection

In one or more embodiments, when a browser receives a resource such as a web page via the Internet, it parses the web page's HTML to ascertain whether there is any structured data contained in the page. Identifying structured data can be performed in any suitable way. For example, if the structured data is specifically described in the web page's HTML, as in the example above, identifying the structured data can be performed by examining the HTML itself. Alternately or additionally, if the resource is a web application, the structured data can be identified through the programmatic interaction between the browser and the application. Alternately or additionally, if the resource is a feed, such as an RSS feed, the structured data can be identified by parsing the RSS feed data.

Once structured data has been identified whether on a web page or some other resource, the browser can present a visual indicator to indicate the presence of structured data and that the structured data can be added to a collection. Any suitable visual indicator can be utilized and any suitable way of presenting the indicator can be used.

Figure 4:
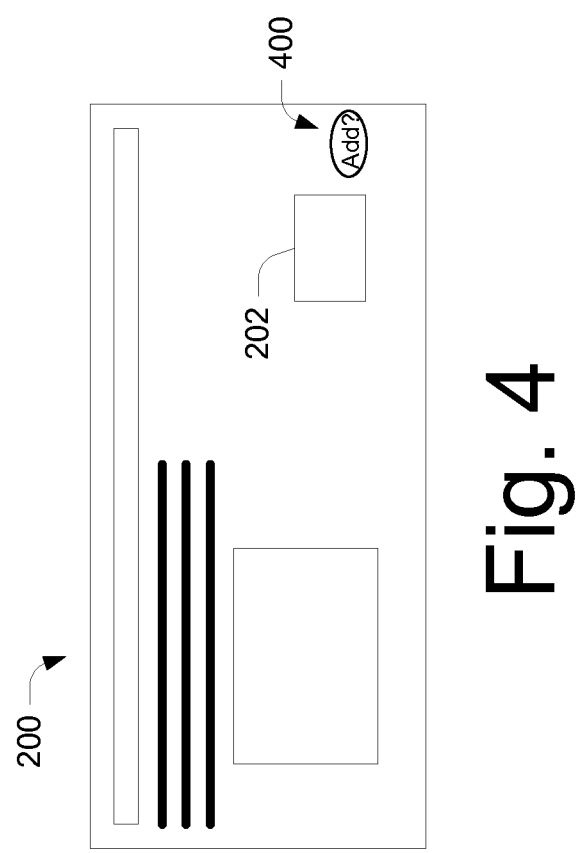
FIG. 4 illustrates a web page in accordance with one or more embodiments.

As an example, consider FIG. 4 which illustrates the FIG. 2 web page. Notice that along side apartment listing 202 a visual indicator 400 in the form of an "Add" button or icon is displayed. This indicator informs the user that the apartment listing includes structured data that can be added to a collection. In one or more embodiments, the icon can be displayed automatically when the page is rendered. In one or more other embodiments, the icon can be selectively displayed when, for example, the user hovers their cursor over or near the structured data.

In one or more embodiments, if the user invokes an add operation on the structured data by, for example, clicking on the visual indicator, the browser can present further dialogs that permit the user to select a collection or create a new collection where the link is to be stored. Storing the link in a collection can include, by way of example and not limitation, storing actual items of the link and its structured data in the collection. Alternately, storing the link can include simply storing a reference to the link, along with any other information that might be stored.

Figure 5:
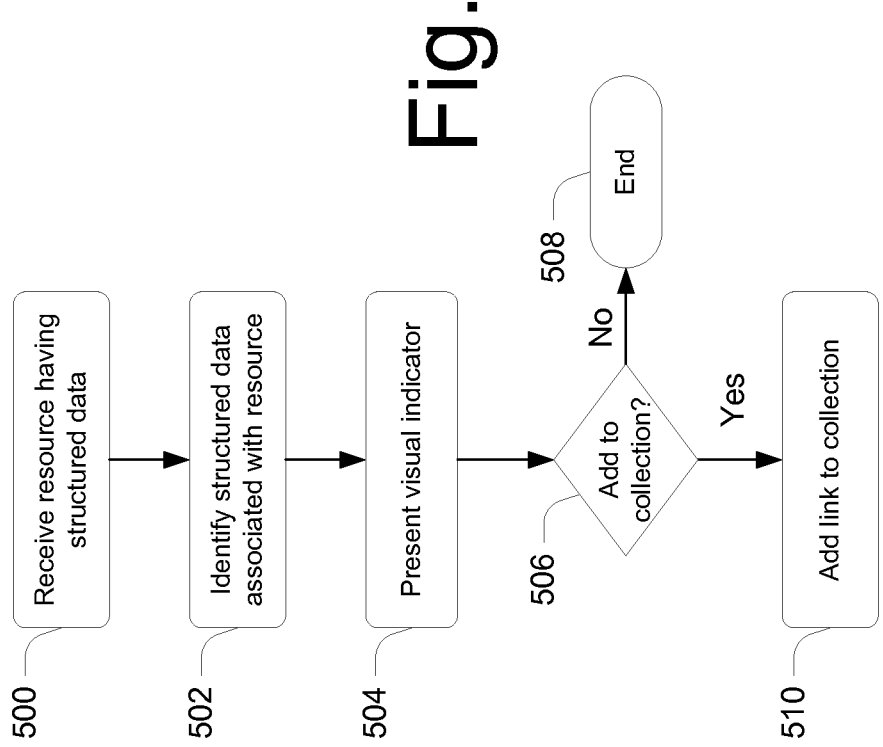
FIG. 5 is a flow diagram that describes steps in a method in accordance with one or more embodiments.

FIG. 5 is a flow diagram that illustrates steps in a method in accordance with one embodiment. The method can be implemented in connection with any suitable hardware, software, firmware or combination thereof. In one or more embodiments, the method can be implemented by a suitably configured web browser, such as the one shown and described in FIG. 1.

Step 500 receives a resource having structured data. Any suitable resource can be received examples of which are given above. Step 502 identifies structured data associated with the resource. Examples of how this can be done are given above. Step 504 presents a visual indicator that indicates the presence of structured data and that a link associated with the data can be added to a collection. Any suitable type of visual indicator can be used an example of which is given above. Step 506 ascertains whether the user has opted to add the link to the collection. This step can be performed in any suitable way. For example, if the visual indicator is in the form of a button or tab, the user can simply click the button or tab. If, at step 506, the user opts to not add the link to a collection, the method ends at 508. If, on the other hand, the user opts to add the item to a collection, step 510 adds the link to a collection. This step can be performed in any suitable way, examples of which are provided above.

Having now discussed the notion of how a user can build a collection, consider now how a suitably configured application, such as a web browser, can enable a user to view their collections in one or more embodiments.

Viewing or Operating on Collections

In the discussion that follows, various different embodiments are described that enable a user to view or otherwise operate upon collections in different ways. Individual embodiments are described under their own respective headings.

Full Page Collection View

In one or more embodiments, an application such as a web browser can provide the ability to view collections in a full page view. Further, in one or more embodiments, this full page view can enable the user to view links associated with different sources or resources, such as various web pages, data from various feeds such as RSS feeds, data added by the client and various web applications and the like. Any suitable type of view can be provided.

Figure 6:
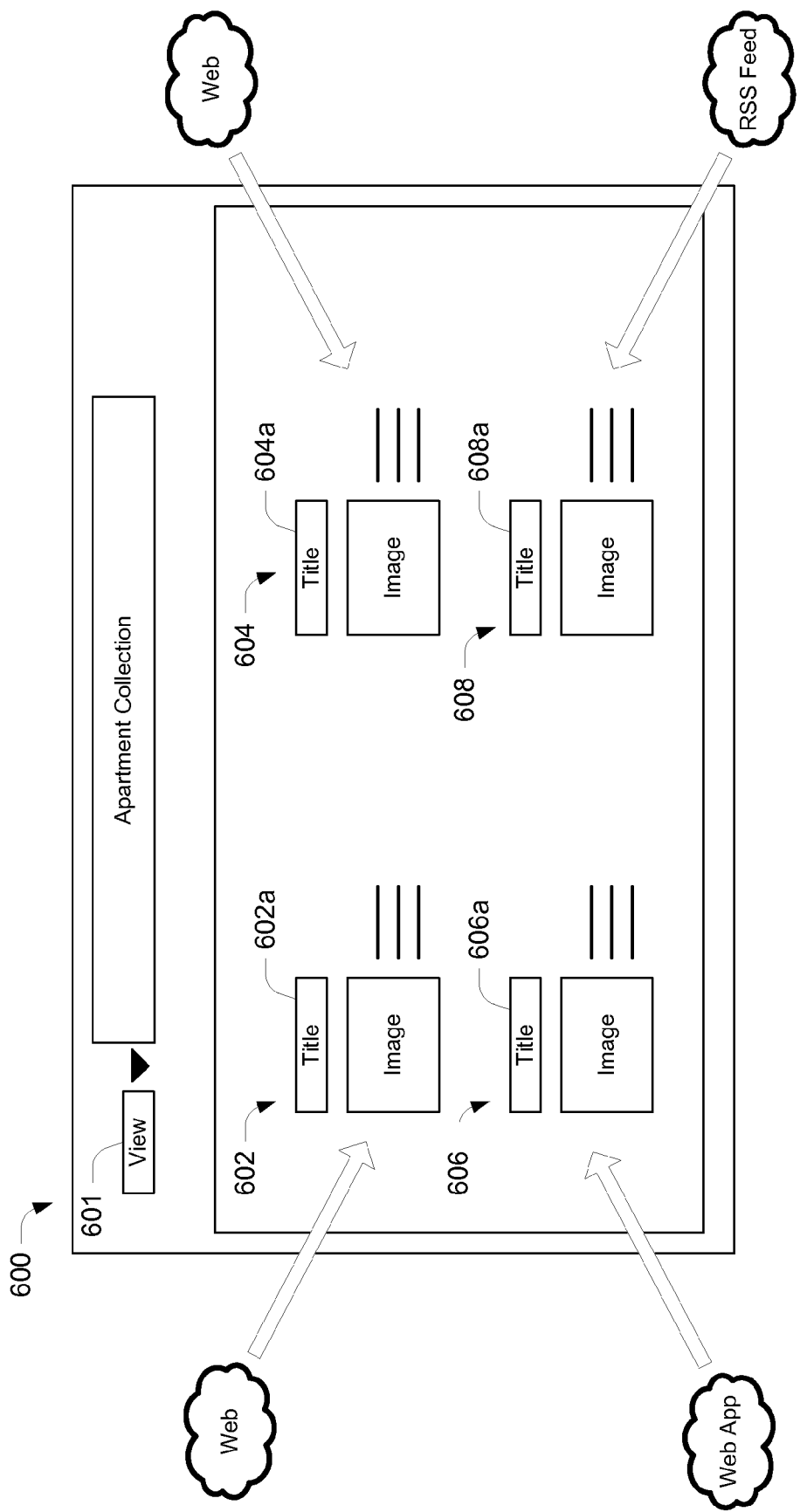
FIG. 6 illustrates an example full page view that presents a collection having links from various different sources in accordance with one or more embodiments.

As but one example, consider FIG. 6 which illustrates, generally at 600, a full page view that presents a collection having links from various different sources in accordance with one or more embodiments. The view that is presented is a generally uniform summary view that includes a summary of the information from the link. In this particular example, the summary view can include, for each link, a title, a thumbnail image, and a few lines of properties associated with the link. The information contained in the summary view has been gleaned by the web browser from the HTML associated with the link. In addition, in one or more embodiments, a user interface component 601 in the form of a view drop down menu can be provided to enable the user to select from among different views, as will become apparent below.

In this example, full page view 600 includes four different links 602, 604, 606 and 608. Each individual link is represented by a title 602*a*, 604*a*, 606*a* and 608*a* respectively. In addition, each individual link includes a thumbnail image as shown. Further each individual link includes a few lines of properties located adjacent and to the right of its associated thumbnail image.

As noted above, the links in a collection can, but need not, come from different sources or different types of sources. In the present example, links 602, 604 have come from a web page; link 606 has come from a web application; and, link 608 has come from an RSS feed.

Having a full page summary view of the links in a collection provides the user with the ability to compare various items in a side-by-side fashion. The summary view provides enough information for the user to understand, at least preliminarily, some of the content associated with the link. In addition, in at least some embodiments, by clicking on or otherwise selecting a particular displayed link, the user's browser can navigate to the web page associated with the structured data or open an associated file if there is no link to a web page.

In one or more embodiments, the summary view constitutes but one view that is available for the user, as will become apparent below.

Collection View with Structured and Unstructured Data

In one or more embodiments, an application such as a web browser can provide the ability to both build collections and view collections that have links that are associated with structured data and links that do not have structured data. As an example, consider FIG. 7. There, a view 700 is shown and represents a so-called title view that displays, for a collection, individual titles of the links that make up the collection. In this example, view 700 includes links that are both associated with structured data—such as links 702, 704, and links that are not associated with structured data—such as links 706, 708. In this example, the titles associated with the structured data may include rich properties that allow them to be presented in a creative way, such as by having a unique font and/or icon associated with them. The links that are not associated with structured data may not have rich properties and may therefore be represented as simply textual titles. The representation of the links associated with the unstructured data can be considered as somewhat analogous to a list of a person's favorites. However, by including links associated with structured data in the collection, the user can be exposed to a variety of rich viewing and interaction experiences.

Searching Collections

In one or more embodiments, an application such as a browser can provide the user with the opportunity to search through a collection. In addition, in one or more embodiments, the application can provide the user with the ability search across multiple collections, as well as to pull in search results from sources other than collections. In one or more embodiments, the results can be based on those items with the same or similar data types. One example of such a source is the user's history of web data. As an example, consider FIG. 8. There, a view 800 is shown. In this example, the application or web browser renders a view that includes a search box 801 in which a user can type various search terms to search across one or more collections and/or other sources.

In this example, the user has an apartment collection that they are looking at in a summary view. In this example, the user has typed "seattle" into the search box to search across their collection for apartment data types having text that matches "seattle" in, for example, the data in the links' address data type. Notice in this example that the results have pulled in two links associated with structured data which meet the criteria—links 802, 804. Further, in this example, the results have pulled in two links associated with the user's history—here, links 806, 808. These history links have not been specifically marked by the user as comprising part of the collection. Yet, in one or more embodiments, the application or browser can build a result set that includes them. In situations like this, the user may have forgotten to add a particular browsed link to their collection but, nonetheless, would be interested in viewing it. In one or more embodiments, a user also has the option of selecting a link from their history and adding it to their collection. In the illustrated example, this can be performed by dragging and dropping the link from the history portion of the display to the collection portion of the display.

In addition, in one or more embodiments, a control box 810 can be provided and can enable the user to search across a collection or collections using various means such as properties and/or data types. In this particular example, the current search has pulled in two results out of the ten links that make up the user's collection—hence the "Displaying 2/10" that appears in the figure. Here, the user has the option of sorting the search results in accordance with various parameters such as, by way of example and not limitation, title, date added, price and size—each of which can be a different data type associated with the link. In addition, the user can also filter on particular data types associated with the links. Here, the links can be filtered on the data type "location" for values that correspond to those that are shown, i.e. "Capitol Hill" and "Downtown".

Thus, the structured data and its manner of representing data as data types can provide a very powerful mechanism for enabling a user to not only build unique and robust collections, but to view and manipulate links of the collection as well.

Multiple Different Selectable Collection Views

As alluded to above, in one or more embodiments, the application or web browser can provide multiple different types of views for a user to view links of their collection.

In one embodiment, three different types of views are provided—a title view, a summary view and a detailed view. The different views, as well as others, can be selected via any suitable type of user interface component, such as user interface component 601 in FIG. 8.

Figure 7:
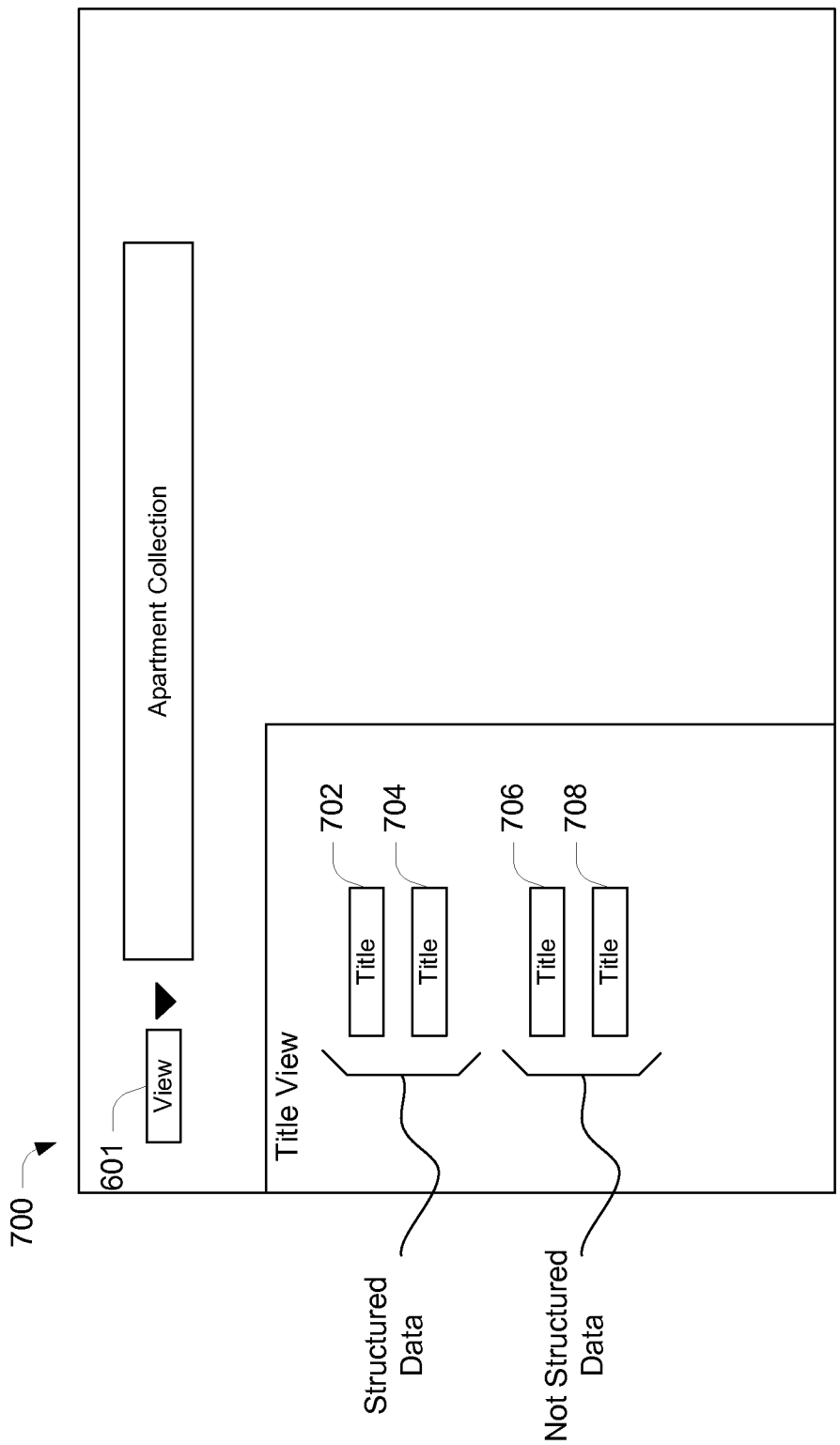
FIG. 7 illustrates an example title view of a collection in accordance with one or more embodiments.
Figure 8:
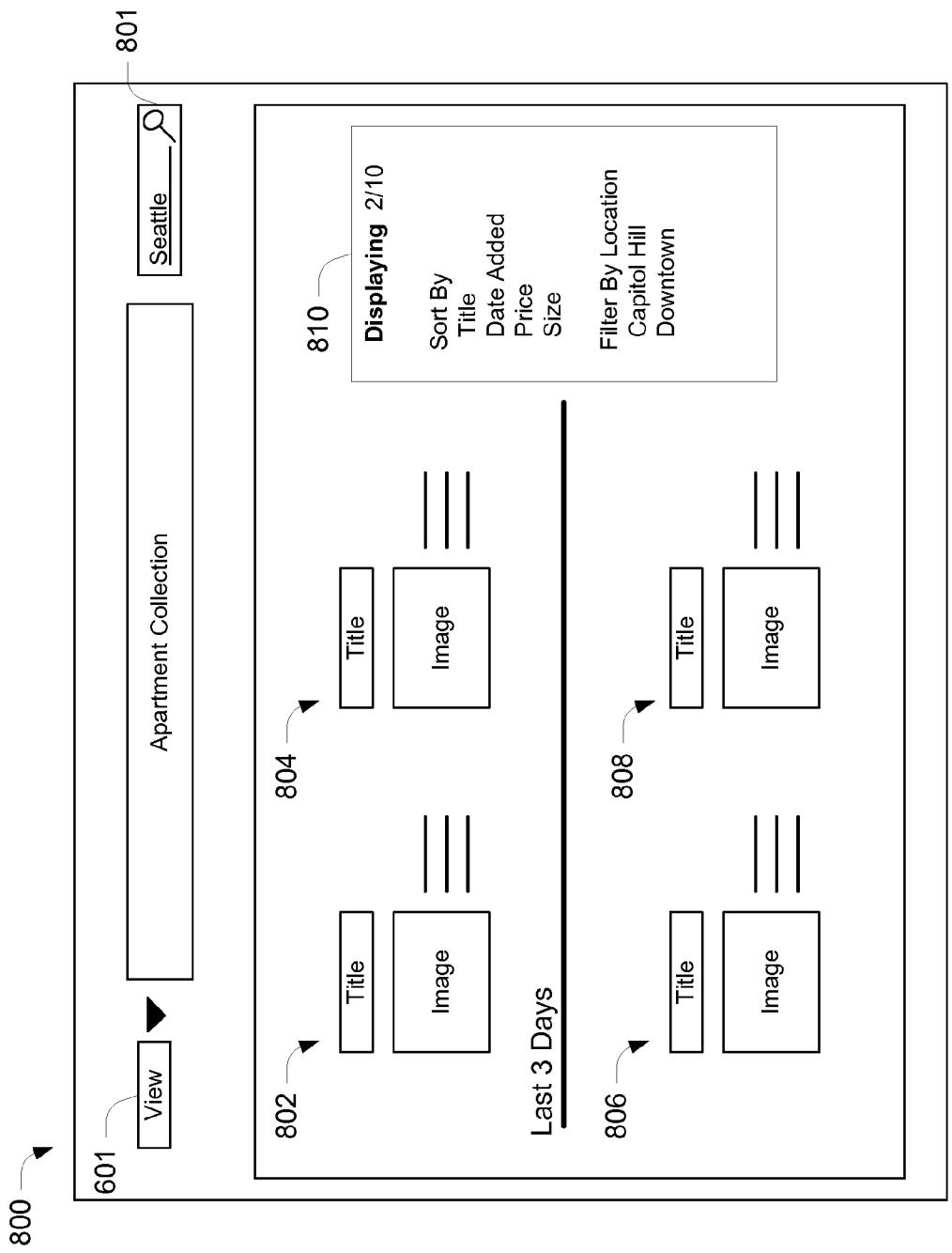
FIG. 8 illustrates a view that allows collections to be searched in accordance with one or more embodiments.

In one or more embodiments, when a web browser receives a web page, the web page is typically described by HTML that includes various descriptions and definitions. One of the things that HTML can include are a number of styles that can be applied to the structured data. A style defines, in some manner, how the data is going to look when it is rendered into a web page. To provide the user with a degree of flexibility in how they view their links, the title view and the summary view can be presented as text or text/image displays. That is, in these views, the various styles and other HTML can be stripped so that a more concise visual representation of the data can be presented. For example, FIG. 7 shows an example title view in which only the title of the link is displayed. FIGS. 6 and 8, on the other hand, show an example summary view that includes not only the title of the link, but some additional information including an image and a few lines of properties associated with the link.

The detailed view represents a more thorough display of the link. For example, the detailed view can show the actual HTML that was captured from the web page in the manner in which it was intended to be presented. In the apartment example, this can include providing, for any particular link, multiple views of the apartment along with a virtual tour of the apartment in which the user can "walk through" the apartment.

Having multiple different types of selectable views can enable the user to view links in their collection in a manner that is most convenient for them. For example, the user may be very familiar with the links in their collection so that the title view is all that they need to access the links for which they are looking. Alternately, the user may be in the preliminary stages of conducting online research so that the summary view provides just enough information to inform the user about a link, but is concise enough to allow a side-by-side presentation and comparison of various links. In this example, if the user finds a particular link of interest, they can simply select that link and change to a detailed view where they can see all of the details associated with that particular link.

Detecting Items that have Changed

In one or more embodiments, if a particular item that is part of a collection has changed in some way, a visual cue can be presented to indicate such a change. For example, if an apartment price has changed, then the browser can detect this and provide a gleam or some other type of visual indication to bring this to the user's attention.

Flagging or Commenting on Collection Items

In one or more embodiments, an application or web browser can provide the user with the option to flag or comment on a particular link. If a user flags or comments on a link, the flag or comment then becomes a property of the link and can be associated with, but stored separately from the link. The user is then able to see the flag or comment within the collection view because the comment or flag effectively becomes part of the link when it is displayed.

Custom Collection Views Based on Data Type

In one or more embodiments, an application or web browser can provide the ability to define one or more custom views for a collection. In at least one embodiment, a custom view can be defined by a data type. So, for example, a contact management experience can create a browser collection view for contacts, as well as other views based on data types. If a collection includes predominately contacts, then the browser can select the custom contact view as a default view of the collection. The user, of course, can change the views. In one or more embodiments, custom views can allow for user interaction. For example, custom views can allow a user to filter based on things such as data type and other parameters.

In one or more embodiments, third parties can design custom views that can be added to the browser. For example, in the apartment collection described above, a third party may design a map view which displays a map that has pin points that indicate the locations of the various apartments of the collection. The user would then be free to switch between the different views. So, for example, the user may search a particular collection for apartments in the Capitol Hill area of Seattle. When the Capitol Hill apartments are displayed in a summary view, as in FIG. 8, the user may then select a custom-designed map view to see where these particular apartments appear on the map.

In one or more embodiments, the individual custom views can be designed to provide a view which is defined by a data type associated with a link. For example, in the apartment collection scenario mentioned just above, the map view can be provided as a viewing option when a user's collection includes data of the type "apartment". In these embodiments, the web browser can ascertain the data types associated with the particular collection, and then make an intelligent decision on which views to expose to the user.

Auto-Converting Links into Collections with Data Types

In one or more embodiments, if a user upgrades from a browser that does not support collections to one that does support collections, the new browser can automatically analyze the user's saved links and auto-convert them into one or more collections. To do this, the browser can retrieve the web pages associated with the links and analyze the web pages for structured data that is available. If the web browser finds structured data that describes various data types associated with the web page, it can process the structured data and add the associated links into a collection. For example, if the user has bookmarked several links under a folder called "apartments", then the browser can automatically set up a collection called "apartments". The browser can then add the individual links as members of the collection. This can be done, in some embodiments, where some links are associated with structured data and where some links are not associated with structured data, as in the example above.

Figure 9:
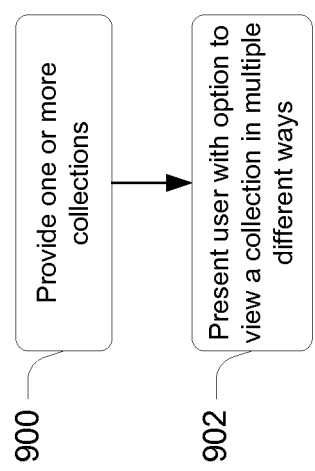
FIG. 9 is a flow diagram that describes steps in a method in accordance with one or more embodiments.

FIG. 9 is a flow diagram that describes steps in a method in accordance with one or more embodiments. The method can be implemented in any suitable hardware, software, firmware or combination thereof. In one or more embodiments, the method can be implemented by a suitably configured web browser application, such as the one described above.

Step 900 provides one or more collections. This step can be performed in any suitable way. For example, in one or more embodiments, a web browser can provide user interface components that enable a user to discover and add particular links to a collection. Examples of how this can be done are described above. Step 902 presents the user with an option to view one or more collections in multiple different ways. This step can be performed in any suitable way. For example, in at least some embodiments, when the user displays a collection, a user interface component in the browser can enable a user to see and then select from among a number of different views. One example of a user interface component is provided above. Any suitable type of view option can be presented to the user. For example, some view options can enable the user to see a full page view of their collection along with information that may be of interest to them, such as a title, images and/or a short list of properties associated with the link. In addition, in at least some embodiments, the links that are viewable can come from different sources such as, for example, web pages, web applications, feeds and the like. Alternately or additionally, in at least some embodiments, one or more viewing options provide the user with the ability to view both links that are associated with structured data and links that are not associated with structured data.

Further, in at least some embodiments, the viewing options that are presented to the user can include user interface instrumentalities that can enable the user to search a collection or collections. In at least some of the searching embodiments, in addition to searching across collections, the browser can provide the user with the ability to search across sources other than collections and have the results displayed along with the collection search results.

Continuing, in one or more embodiments, some of the other viewing options that can be presented to the user include, by way of example and not limitation, a title view, a summary view and a detailed view each of which is described above. Alternately or additionally, one of the viewing options can enable the user to flag or otherwise comment on a particular link. Alternately or additionally, another viewing option can enable the user to select from among one or more custom-designed views. These custom-designed views can, but need not, be based on various data types that are associated with the links.

Figure 10:
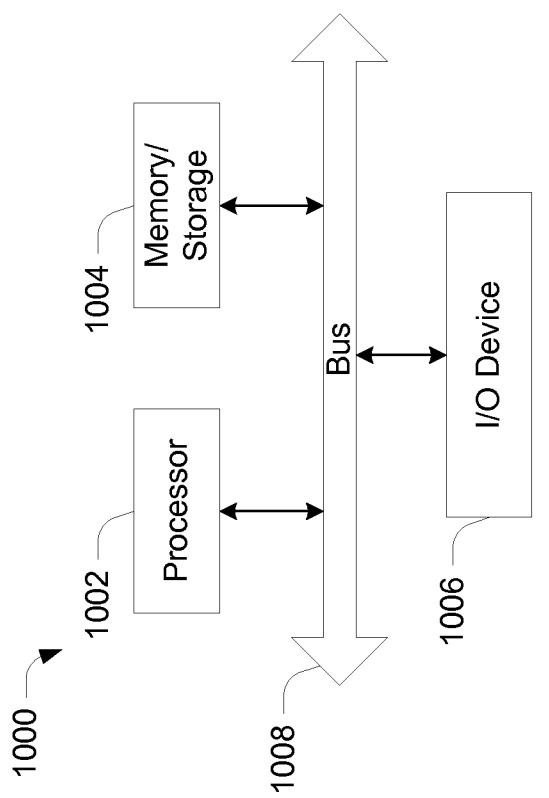
FIG. 10 illustrates an example system that can be used to implement one or more embodiments.

FIG. 10 illustrates an example computing device 1000 that can implement the various embodiments described above. Computing device 1000 can be, for example, computing device 102 of FIG. 1 or any other suitable computing device.

Computing device 1000 includes one or more processors or processing units 1002, one or more memory and/or storage components 1004, one or more input/output (I/O) devices 1006, and a bus 1008 that allows the various components and devices to communicate with one another. Bus 1008 represents one or more of any of several types of bus structures, including a memory bus or memory controller, a peripheral bus, an accelerated graphics port, and a processor or local bus using any of a variety of bus architectures. Bus 1008 can include wired and/or wireless buses.

Memory/storage component 1004 represents one or more computer storage media. Component 1004 can include volatile media (such as random access memory (RAM)) and/or nonvolatile media (such as read only memory (ROM), Flash memory, optical disks, magnetic disks, and so forth). Component 1004 can include fixed media (e.g., RAM, ROM, a fixed hard drive, etc.) as well as removable media (e.g., a Flash memory drive, a removable hard drive, an optical disk, and so forth).

One or more input/output devices 1006 allow a user to enter commands and information to computing device 1000, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

CONCLUSION

Various embodiments utilize structured data contained within a resource, such as a web page, to enable a user to define collections of data. Individual constituent parts of a collection or "links" are collected within a collection. In one or more embodiments, a full page viewing experience can be provided which enables users to not only view more details for a given link, but to view multiple different links at a time.

In one or more embodiments, the browser can provide multiple different selectable views that can be applied to the various collections. Accordingly, the user can define how data of the collection is presented to them. Further, in at least some embodiments, custom views can be defined and permit views of the collections to be flexibility and extensibly defined.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computer-readable storage memories embodying processor-executable instructions which, responsive to execution by at least one processor, are configured to:
   present a visual indicator that indicates that a link associated with structured data contained within a rendered resource can be added to a collection, the structured data described using one or more data types, the processor-executable instructions to present the visual indicator further configured to display the visual indicator with the rendered resource;
   add the link associated with structured data to the collection;
   enable display of the collection, the collection comprising:
      at least one link associated with structured data; and
      at least one link that is not associated with structured data; and
   enable selection of an option to view the collection in multiple different ways, wherein at least one of the ways that the collection can be viewed is a full page view that includes a summary of information from individual links, the full page view configured to enable a side-by-side comparison of items in the collection.

2. The one or more computer-readable storage memories of claim 1, wherein the processor-executable instructions are further configured to add the link to the collection responsive to at least receiving selection of the visual indicator.

3. The one or more computer-readable storage memories of claim 2, wherein the processor-executable instructions are further configure to:
   receive selection of the visual indicator; and
   responsive to selection of the visual indicator, display a dialog box that:
      enables the link to be added to an existing collection; or
      enables creation of a new collection to add the link to.

4. The one or more computer-readable storage memories of claim 1, wherein processor-executable instructions are further configured to display the visual indicator responsive to detecting a cursor in a hover position over a portion of the rendered resource associated with the structured data.

5. The one or more computer-readable storage memories of claim 1, wherein the structured data comprises one or more data types associated with real estate.

6. The one or more computer-readable storage memories of claim 1, wherein the collection further comprises at least one of:
   structured data without a link; or
   a nested collection of one or more links.

7. The one or more computer-readable storage memories of claim 1, wherein the processor-executable instructions are further configured to:
   determine when an item in the collection has information that has changed from a last determination of the information; and
   display a visual cue effective to indicate the item has changed information.

8. A computer-implemented method comprising:
   presenting a visual indicator that indicates that a link associated with structured data contained within a rendered resource can be added to a collection, the structured data described using one or more data types, the presenting the visual indicator further comprising displaying the visual indicator with the rendered resource;
   adding the link associated with structured data to the collection;
   enabling display of the collection, the collection comprising:
      at least one link associated with structured data; and
      at least one link that is not associated with structured data; and
   enabling selection of an option to view the collection in multiple different ways, wherein at least one of the ways that the collection can be viewed is a full page view that includes a summary of information from individual links, the full page view configured to enable a side-by-side comparison of items in the collection.

9. The computer-implemented method of claim 8 further comprising:
   determining when an item in the collection is associated with data that has changed from when the item was added to the collection; and
   displaying a visual cue effective to indicate the item has changed data.

10. The computer-implemented method of claim 8 further comprising:
    providing an option to flag or comment on a particular link contained within the collection;
    responsive to receiving a flag or comment associated with the particular link, storing the flag or comment; and
    displaying the flag or comment when at least some data associated with the particular link is displayed.

11. The computer-implemented method of claim 8, wherein at least one view associated with viewing the collection comprises a custom view that is customized based, at least in part on a type of the structured data.

12. The computer-implemented method of claim 11, wherein the custom view is a default view for viewing the collection when the type of the structured data is a predominate structured data type in the collection.

13. The computer-implemented method of claim 8 further comprising:
    displaying a search box configured to enable a user to enter a search term;
    receiving a search term via the search box;
    searching at least the collection based, at least in part, on the received search term.

14. The computer-implemented method of claim 13 further comprising:
    displaying results from searching at least the collection, the results based, at least in part, on a history of previously accessed data.

15. A system comprising:
    at least one processor;
    one or more computer-readable storage memories comprising processor-executable instructions which, responsive to execution by the at least one processor, are configured to:
       present a visual indicator that indicates that a link associated with structured data contained within a rendered resource can be added to a collection, the structured data described using one or more data types, the processor-executable instructions to present the visual indicator further configured to display the visual indicator with the rendered resource;
       add the link associated with structured data to the collection;

enable display of the collection, the collection comprising:
  at least one link associated with structured data; and
  at least one link that is not associated with structured data; and
enable selection of an option to view the collection in multiple different ways, wherein at least one of the ways that the collection can be viewed is a full page view that includes a summary of information from individual links, the full page view configured to enable a side-by-side comparison of items in the collection.

16. The system of claim 15, wherein the multiple different ways further comprise at least one of:
  a title view; or
  a custom view that is customized based, at least in part on a type of the structured data.

17. The system of claim 16, wherein the custom view is a default view for viewing the collection when the type of the structured data is a predominate structured data type in the collection.

18. The system of claim 15, wherein the processor-executable instructions are further configured to:
  determine when an item in the collection is associated with data that has changed from a last determination of the data; and
  display a visual cue effective to indicate the item is associated with changed data.

19. The system of claim 15, wherein the processor-executable instructions are further configured to:
  analyze one or more saved links; and
  automatically group the one or more links into one or more collections.

20. The system of claim 19, wherein the processor-executable instructions to analyze the one or more saved links are further configured to:
  retrieve content based, at least in part, on the one or more saved links; and
  analyze the content for structured data.

\* \* \* \* \*